United States Patent [19]

Bohm et al.

[11]  4,285,654
[45]  Aug. 25, 1981

[54] APPARATUS FOR CONTINUOUS TREAD PRODUCTION

[75] Inventors: George G. A. Bohm, Akron, Ohio; Stanley S. Gross, Evans City, Pa.

[73] Assignee: The Firestone Tire & Rubber Company, Akron, Ohio

[21] Appl. No.: 114,094

[22] Filed: Jan. 21, 1980

Related U.S. Application Data

[62] Division of Ser. No. 908,345, Jun. 12, 1978, Pat. No. 4,230,649.

[51] Int. Cl.³ .............................................. B29D 7/22
[52] U.S. Cl. .................................... 425/327; 425/371
[58] Field of Search ...................... 425/90, 92, 94, 96, 425/102, 104, 106, 325, 327, 371

[56] References Cited

U.S. PATENT DOCUMENTS

| | | |
|---|---|---|
| 1,454,058 | 5/1923 | Lowe .................................... 425/325 |
| 3,382,303 | 5/1968 | Stieg ................................. 425/325 X |
| 3,557,407 | 1/1971 | Lemelson ......................... 425/327 X |
| 3,584,343 | 6/1971 | Kohlepp et al. .................. 425/327 X |
| 3,594,866 | 7/1971 | Skinner et al. ................... 425/371 X |
| 3,734,415 | 5/1973 | Franz et al. ....................... 425/325 X |
| 3,850,558 | 11/1974 | Payrandeau ........................ 425/101 |
| 3,852,387 | 12/1974 | Bortnick et al. ................. 425/327 X |
| 3,957,413 | 5/1976 | Lieberman ............................ 425/371 |
| 4,017,248 | 4/1977 | Dieffenbacher et al. ............. 425/371 |
| 4,043,719 | 8/1977 | Jones ................................... 425/371 |
| 4,128,369 | 12/1978 | Kemerer et al. ................. 425/327 X |
| 4,128,373 | 12/1978 | Greten ................................. 425/371 |

FOREIGN PATENT DOCUMENTS

| | | |
|---|---|---|
| 2149133 | 4/1973 | Fed. Rep. of Germany ........... 425/327 |
| 6704289 | 2/1967 | Netherlands ............................ 425/327 |

Primary Examiner—J. Howard Flint, Jr.
Attorney, Agent, or Firm—Wyatt, Gerber, Shoup, Scobey & Badie

[57] ABSTRACT

An apparatus for the production of a continuous rubber strip which is molded with surface designs, such as tire treads, in the uncured state and then cured, after removal from the mold, by heat or radiation is disclosed. In the apparatus the extruded rubber strip is passed between cooperating mold segments carried by respective endless belts which, along with related components, apply suitable temperatures and pressures to the strip to product the surface designs. The molded uncured rubber strip is removed from the molds and then completely cured by radiation and/or heat.

18 Claims, 5 Drawing Figures

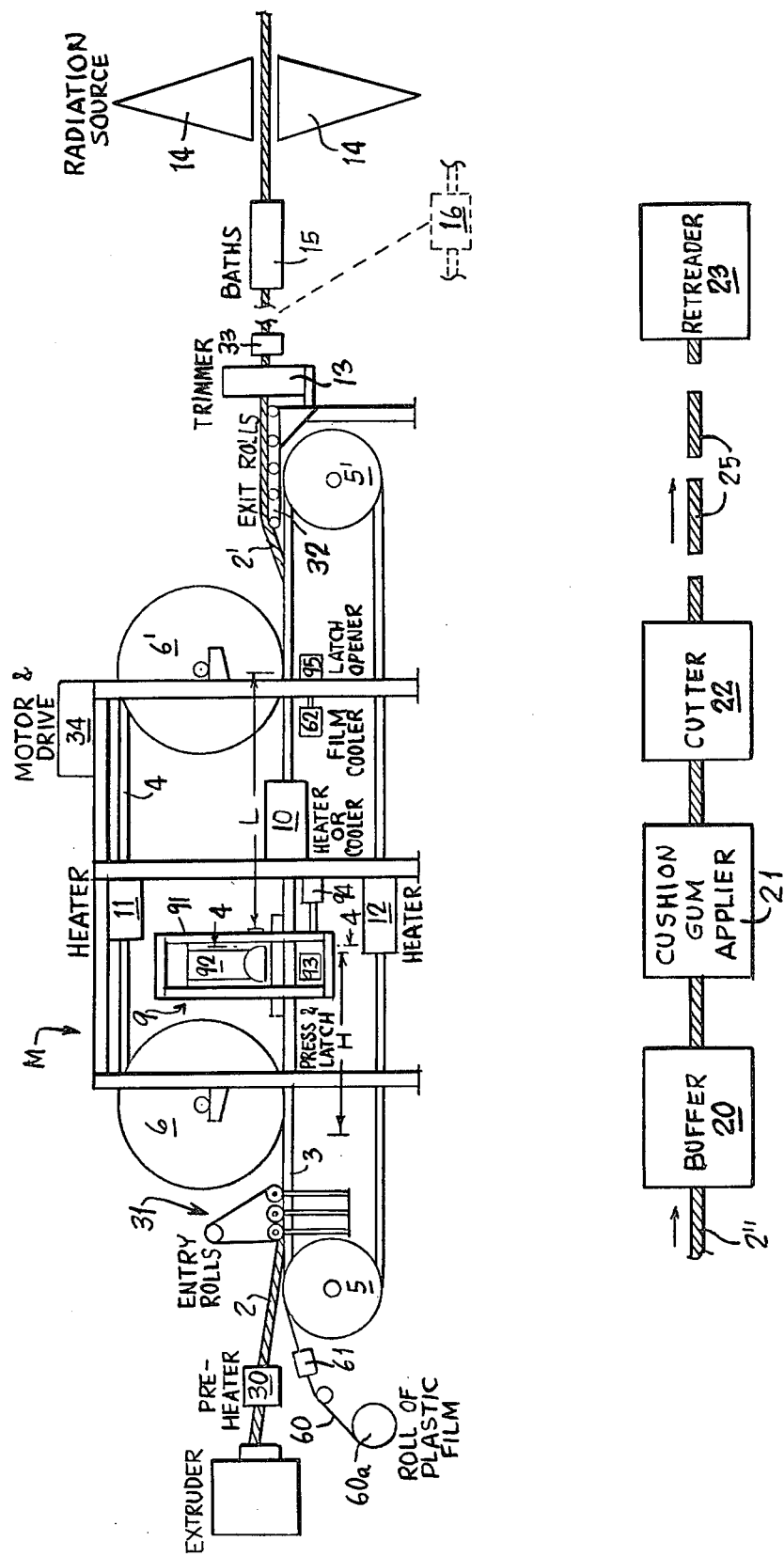

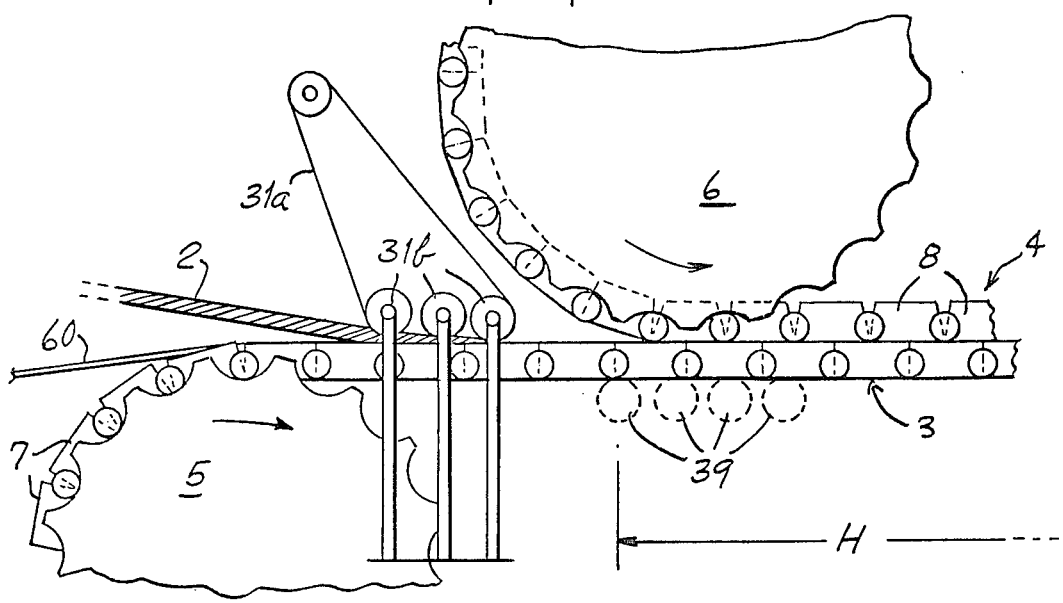
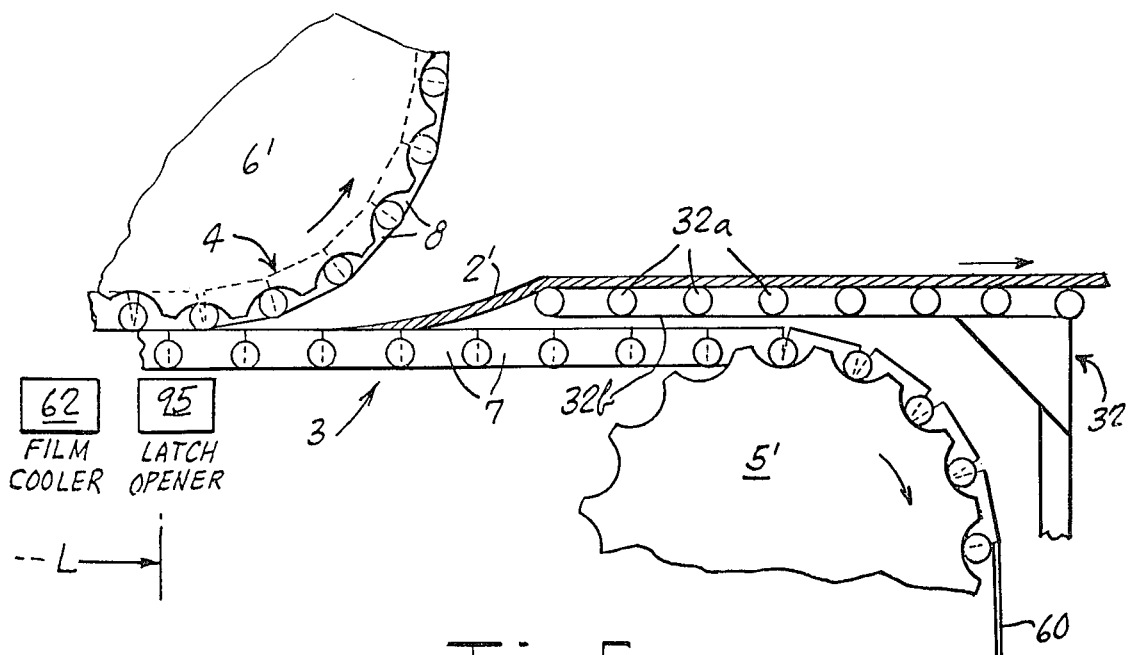

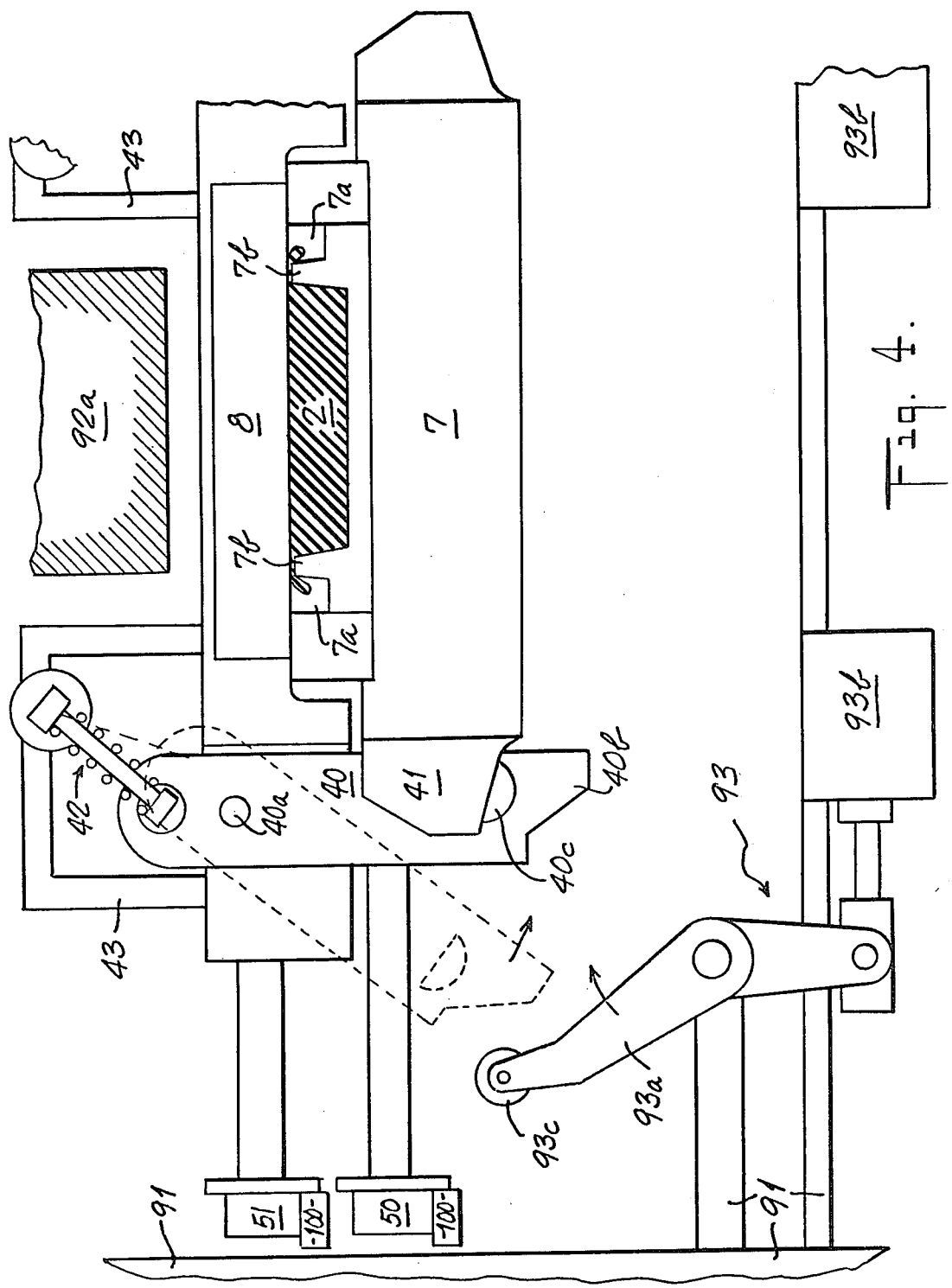

APPARATUS FOR CONTINUOUS TREAD PRODUCTION

This is a division, of application Ser. No. 908,345 filed June 12, 1978, now U.S. Pat. No. 4,230,649.

BACKGROUND OF THE INVENTION

The present invention involves the continuous production of rubber strip material impressed with a surface design and, more particularly, to an apparatus for the molding of a continuous strip of uncured or partially cured rubber with a design, such as a tire tread, and the curing thereof after removal from the mold.

Presently, tire treads, such as are employed in retreading worn tires, are made for the most part by simultaneously shaping and heat curing rubber compounds in a mold. The rubber stock is kept in the mold under pressure for essentially the entire curing period, since premature removal may cause so-called "blowing of the stock", that is, formation of numerous small voids caused by expansion of water and gases generated during the curing process. High pressures and long molding times of over 15 minutes are generally required to prepare a tread of good quality. As a result, this process has been essentially discontinuous, that is, the treads have been made in individual sections one at a time. Even when the process has been made continuous using cooperating endless belt molds with the rubber in strip form, such as disclosed, for example, in U.S. Pat. Nos. 3,214,792, 3,827,846 and Ger. GM 71 10 999, it has been found to be comparatively time-consuming.

Attempts at using more rapid radiation curing of the tire thread rubber, such as suggested, for example, in U.S. Pat. Nos. 1,906,402, 2,933,441, and 3,959,053, have not been entirely successful. It has been throught impractical to completely cure such treads by radiation, as it would require an exposure of the rubber stock while traveling in the mold. Penetration of the mold, which is usually made from steel, would necessitate the use of gamma rays, and as commercial sources produce gamma rays only at moderately low intensities, very long tread cure times would be required.

SUMMARY OF THE INVENTION

It has now been appreciated by the present inventors that tire treads can be rapidly produced and completely cured by radiation if they are first molded and then removed from the mold in the uncured state without causing a distortion of the intricate tread pattern. The undistorted removal of the uncured tread has not been thought possible by those skilled in the art. The present invention provides an apparatus and process which take advantage of this heretofore unrealized capability of uncured or green rubber to be molded without curing and uses subsequent radiation or heat curing after the removal of the embossed rubber from the mold to produce an improved product at a more rapid rate.

Further, in the past, the time required for molding the rubber has been determined by curing conditions and not mold design. Such factors as heat transfer, prevention of blowing, modulus development, and induction time have required molding cycles to be longer than the time actually needed to achieve mold design definition. Because of the fact that curing is not carried out in the mold, heat transfer and blowing problems are avoided, and a more rapid cure with radiation outside the mold may be used to achieve fast modulus development. Molding time with the present invention therefore is dependent only on the conditions necessary to produce the desired design on the green tread in the mold, and to retain the design outside of the mold prior to radiation or heat curing. As a result, the molding and curing times are considerably reduced. Molding cycles can be under 5 minutes at 120° C. and 1000 psi for fast molding, and this permits the design of equipment for continuous and rapid production.

Accordingly, the present invention comprehends an improved apparatus for the continuous production of a rubber strip which is molded with a surface design such as a tire tread.

An apparatus for performing the basic steps of the process comprises: an extruding device for extruding the green rubber at, for example, 100° C., and which preferably is a vacuum extruder to pull off the volatiles; a molding machine in the form of two cooperating endless belts through which the extruded strip is passed at about 120° C., or other temperatures below curing, and at elevated pressures, for impressing the tread design thereon; and means for curing the molded strip after removal from the mold in the uncured state using radiation or heat, or both. Additional means for preparing the cured tread strip for retreading may be included in the form of means for buffing or roughening the underside of the tread strip; means for applying cushion gum to the roughened portion; means for cutting the tread strip into sections; and means for applying the tread sections to the tire carcasses in the retread operation.

Stresses in the rubber with the present apparatus and process are minimized as compared to the stresses of conventional heat curing which are "cured in" when the tire tread is cured completely in the mold, and tire treads formed by a process which includes radiation treatment are more abrasion resistant than conventional heat cured products. Also, although described in connection with tire treads, this apparatus will also be found to be particularly suitable in the production of a wide variety of rubber products that are produced in the form of sheets or strips having a surface design. Such products include, for example, acoustical sheeting, floor tiles, decorative sheeting, floor mats, automotive mats and the like.

In addition, the apparatus may be used to perform improved processes wherein the rubber is partially cured in the mold.

BRIEF DESCRIPTION OF THE DRAWINGS

FIG. 1 is a diagrammatic representation of a continuous tire tread producing apparatus in accordance with the present invention.

FIG. 2 is a diagrammatic representation of additional apparatus whicy may be used with that of FIG. 1 in a retreading operation.

FIG. 3 is a showing in greater detail of the entrance portion of the molding machine in the apparatus of FIG. 1.

FIG. 4 is a view of a reciprocating press and mold latching apparatus taken along the lines 4—4 in FIG. 1.

FIG. 5 is a showing in greater detail of the exit portion of the molding machine.

DETAILED DESCRIPTION OF THE INVENTION

It will be seen with reference to FIG. 1 that the processes of the present invention are made continuous through the use of apparatus including a molding machine M, essentially in the form of two cooperating endless belts, through which a continuous rubber strip is passed. The apparatus will be described in connection with a preferred process wherein the strip is uncured during molding. In any event, whether the strip is uncured or partially cured during molding, a suitable extruding machine 1 is used to produce a laminar green rubber strip 2 for feeding to the molding machine M. The extruder 1 is preferably of the vacuum type, so that the volatiles from the green rubber are drawn off, and is operated at a temperature of about 100° C. for most rubber stocks. The cross section of the strip should be similar in shape to the final molded produce to be sure to minimize rubber flow during molding so that minimum distortion of the molded rubber tread will result when it is removed uncured from the mold cavity. The cross section should also be slightly larger than that of the final cured tread to ensure that the mold cavity is completely filled.

The strip 2 may be passed from the extruder 1 through a preheater 30 to raise it to a selected temperature prior to entering the molding machine M. The machine M comprises a lower, tread-design belt 3 mounted on sprockets 5 ang 5', and an upper, flat-plate belt 4 mounted on sprockets 6 and 6', along with associated equipment 9–12 for applying the appropriate temperatures and pressures for molding. Each of the belts transports a set of mold segments, the lower belt 3 carrying mold blocks 7 containing a tread design recessed therein and the upper belt 4 carrying flat surface mold covers 8 (see FIGS. 3 and 5).

The lower belt 3 is made longer than the upper belt 4 to permit the green rubber strip to be placed on the tread-design belt 3 while it is in linear travel so that the block mold segments 7 of the belt are already butted together in a continuous design pattern as seen in detail in FIG. 3. This prevents rubber from flowing between the mold segments 7 which are higned on the sprocket side. Also, the upper belt 4 moves away from the molded strip 2' before the lower belt 3 to permit removal of the strip from the mold segments 7 before they end their linear travel to avoid distortion of the molded pattern. To facilitate removal of the strip after molding, a mold release agent may be applied to either the green rubber strip 2 or the appropriate surfaces of the mold segments on belts 3 and 4 before entering the mold.

To assist the placing of the strip in the mold recesses a preforming device 31 may be provided in the form of a pressure imposing means such as a set of rollers of a steel belt 31a mounted about a set of rollers 31b for pressing the strip into the mold segments 7 prior to its entering the mold closing point. As seen in FIG. 3, the bevelled mold segments 8 of the flat-plate belt 4 are hinged at the surface which is in contact with the rubber strip 2.

Heat is necessary to rapidly form the rubber to the contour of the mold, so that the mold must be heated, or alternatively the rubber can be heated, to provide some of the necessary heat such as by the preheater 30 (FIG. 1). The mold temperature is preferably about 120° C. However, depending upon the constituents of the rubber, it may be in the range from 120° C. to about 170° C., but in any event, it is maintained below a temperature which will initiate curing. The imposition of a high pressure is necessary initially to impress the mold pattern on the rubber. This should be followed by the maintenance of a lower pressure for a longer time to relieve the stresses which may have developed under the high pressure. More pressure is needed to mold the rubber with the present method than is used in the former conventional process since it is desired to achieve a continuous and fast molding of the tread. Thus, a combination of heat and high pressure are used to produce the rapid shaping.

To this end, after passing the mold closing point where the two endless belts cooperate, the green rubber strip 2 is compressed in the mold at approximately 1000 psi in a high pressure section H. This pressure can be impressed on the mold by, for example, cooperation of the flat-plate belt sprocket 6 with a set of pressure rollers 39 (see FIG. 3) beneath belt 3. The high pressure section H forces the rubber to flow into the tread design pattern in belt 3, and thereafter the rubber only needs to be contained to relax some of the internal stresses due to mold flow. A lower pressure section L is then used to contain the rubber during this relaxation wherein the pressure can vary from ambient to 1000 psi. The lower pressure can also be provided by roller bearings or by a simple clamping mechanism applied to the cooperating mold segments. However, the preferred components for imposing the desired pressure profile are in the form of reciprocating press and mold latching apparatus 9 shown and described in greater detail in connection with FIG. 4.

A heating or cooling section 10 provides latitude if some stocks need certain temperature cycles before demolding, that is, some stocks may need to be cooled, while others may need higher molding temperatures. The heating or cooling can be accomplished by any suitable means known in the art for this purpose, such as steam, hot air, or a water bath, respectively. Although the section 10 is shown in the lower pressure section L, it may be made to extend the full length of both sections H and L.

After the desired molding time, the two belts pass out of the lower pressure section L and the flat-plate belt 4 begins its circumferential travel around the return sprocket 6' opening the mold. The molded green rubber tread 2' is removed from the tread-design belt 3 before the tread-design mold segments 7 begin their circumferential travel around return sprocket 5', so that the tread will not be distorted by the parting edges of the tread-desine mold segments 7. If necessary, before returning to the respective belt sprockets 6 and 5, the mold segments can be reheated by heaters 11 and 12 to the rubber molding temperature.

To assist the gentle removal of the molded green rubber tread 2' a lifting device 32 (see FIG. 5) may be provided in the form of a set of rollers 32a with or without a surrounding travelling belt 32b disposed immediately adjacent the point of removal from the mold.

After removal from the mold the "flash" or excess rubber on the strip may be trimmed by a trimmer 13 before the curing is performed.

As soon as possible after demolding the molded green tread 2' is cured, preferably by being irradiated to the desired modulus using a suitable source of radiation 14, such as a device for producing a high energy beam of electrons. A trough or bath 15 may be provided before the irradiation for supplying a liquid such as water or an aqueous polyethylene oxide solution which fills the sipes and grooves in the tread to ensure a uniform cross-sectional radiation dose. The tread may be cured by disposing a radiation source 14 on each side thereof as shown, so as to decrease the electron energy requirements from the radiation units necessary to penetrate the tread thickness. However, since the tread is on the underside of the strip upon removal from the mold, in order to use the bath 15 it is necessary to invert the strip before passing it therethrough. Thus, means may be provided for gently inverting the strip before passage through the bath and between the two radiation sources, or a single radiation source may be used whose beam irradiates the upper or back side of the strip during an initial pass after removal from the mold, and the strip may then be returned by way of a roller for a second pass during which the tread side, now filled with the liquid from the bath, is exposed to the beam. Alternatively, the strip 2' may be completely heat cured by a conventional heating means 16 (shown in dotted lines in FIG. 1) or partially heat cured by means 16 and partially radiation cured. After any of these procedures the cured tread strip 2" will then be ready for the retread operation.

As seen in FIG. 2, the retread operation may be performed by first passing the cured strip 2" through a buffer 20 and then through a cusion gum applier 21. The tread strip applied with cushion gum is then passed to a cutter 22 which cuts it into segments 25 ready for use by application to respective tire carcasses in the retreader apparatus 23.

Considering the molding machine M in greater detail, it will be seen in FIG. 3 that the tread-design belt 3 is made up of block mold segments 7 which are hinged from the sprocket side so that the block mold segments after revolving around sprocket 5 form a butt interface during molding. The butt interface is necessary since the tread design recess or cavity is continuous from segment to segment and the flowing of rubber between the mold segments is to be avoided. The bevelled belt segments 8 of the flat-plate belt 4 are hinged away from the sprocket, as they must close while compressing the rubber, and it is desired to avoid gouging of the upper surface of the strip in the tread-design belt 3. This hinge arrangement also prevents rubber from flowing between the parting gaps during molding. The mold segments in each of the belts may be connected in any suitable manner such as with a chain or pins and blocks as shown in FIG. 4. The flat-plate belt 4 is driven, by a suitable motor and drive 34, and carries the tread-design belt 3 along with it by means of the mold latching arrangement.

Referring to FIGS. 1 and 4, it will be seen that the reciprocating press and mold latching apparatus 9 comprises a frame 91 through which the cooperating mold belts pass and on which are mounted a high-pressure imposing means 92, such as an hydraulic press, and mold latch locking means 93 in the form of a set of pivoted bell crank levers 93a (only one of which is shown in FIG. 4) operated by hydraulic cylinders 93b mounted on the frame 91 on either side of the molds. The frame 91 is mounted for short reciprocating movement along the direction of movement of the belts on the machine frame and is driven by means such as a reciprocating piston of an hydraulic cylinder 94 shown in FIG. 1. As each cooperating mold segment passes through the frame 91, the frame moves with it, while the operator 92a of the hydraulic press is caused to force the flat-plate segment 8 against the tread design mold segment 7, pressing the rubber strip 2 into the tread design. As previously mentioned, the cross section of the rubber strip is larger than that of the mold design, so that the rubber will be caused to enter all portions of the design under high pressure, the excess portions being permitted to escape into overflow troughs 7a on either side of the upstanding mold edge portions 7b. While the rubber stock is being maintained under high pressure in the mold, the mold latching arrangement is caused to lock, so that when the hydraulic press operator 92a is retracted the cooperating mold segments are held together to maintain a lower pressure on the rubber during a relaxation period.

The mold latching arrangement is in the form of two toggle latch members 40 (only one being shown) on the flat-plate belt 4 with cooperating fixed cam surfaces 41 on the lower belt mold segment 7. The latch member 40 is mounted on a pivot 40a attached to the flat-plate segment 8 and is held in either of two positions by a spring-loaded toggle member 42 mounted on a yoke 43 on the upper part of the flat-plate segment. In the open position (indicated in dashed lines) the latch member extends outwardly from the cooperating mold segments upon entering the high pressure section H. When the molds are pressed together by the hydraulic press operator 92a, an extension 40b on the lower portion of the latch member 40 is engaged by a roller 93c on the free end of bell crank lever 93a which is pivoted toward the mold segments by hydraulic operator 93b on the frame 91. The action of the pivoting bell crank lever 93a causes the latch member 40 to snap into its other position adjacent the mold segments as shown in full lines in FIG. 4. A substantially semicircular member 40c is provided on the lower end of the latch member 40 for cooperatively following and engaging the cam surface 41 on the mold segment 7, thus holding the two mold segments together during continued travel of the two belts.

After the high pressure has been imposed on the mold segments for the required period of time operator 92a is released and the frame 91 is caused to return to its initial position by cylinder 94, while the bell crank levers 93a are pivoted to their retracted position, preparatory to a similar operation upon the next successive set of mold segments. This reciprocating sequence is continued for each successive set of mold segments during which the proper pressure profiles are applied.

After travelling through the low pressure section L for the requisite period, latch opening means 95 are disposed just before the exit portion of the machine where the two belts separate. The latch opening means may be of similar construction to the latch closing means or merely a cam surface which engages the inside surface of the latch member extension 40b to cause the latch member 40 to pivot to its open position unlocking the two mold segments. As seen in FIG. 5, the flat-plate belt 4 then begins its circumferential travel around return sprocket 6' opening the mold, and the molded green rubber tread 2' is removed from the tread-design belt 3, before the tread-design mold segments begin their circumferential travel around return sprocket 5', by being guided on the exit roll arrangement 32.

It will be seen in FIG. 4 that the mold segments 7 and 8 have rollers 50 and 51 respectively attached to their opposite ends which ride on appropriate parallel rails 100 during their passage through the molding machine.

After removal from the mold, the resulting tread may be quenched in water such as in the bath 15 to inhibit distortion. If desired, a rapid cooling means 33, such as a liquid nitrogen both or dry ice, may be interposed before bath 15. The time between taking the tread from the mold and the curing step is normally less than 5 minutes.

A release agent is used preferably in the mold to facilitate the removal of the tread therefrom. It may be introduced into the mold segments in the heater units 11 and 12. The most desirable release agents are water-soluble release agents which leave a wet film. Those based on glycols or silicones appear to be the most suitable. Water-solubility is desirable so tht the release agents can be removed at the end of the process. Also, when using radiation curing the tread indents may be filled with water in bath 15 to equalize the radiation dosage, and the water will also serve to remove the water-soluble release agent. The water may be mixed with polyethylene oxide to form a gel which, because of its high viscosity, will stay in place in the grooves during irradiation without spilling, to ensure uniform radiation dosage throughout the volume of the tread. Water, of course, is very inexpensive and thus a desirable filler, and a surfactant may be added to reduce the surface tension, or other materials added to adjust the density, of the water and help fill in the small sipes and grooves.

An alternative to the use of a release agent is shown in FIG. 1 in the form of a plastic stretch film 60, such as polypropylene, which is introduced over the surface of the tread-design mold segments 7 of belt 3 just before the introduction of the rubber strip 2 therein. The film 60 is released from roll 60$q$ and heated in a heater 61 to a temperature above its melting temperature and applied to the upper surface of the tread-design mold segments 7 under flow conditions so that when the rubber strip 2 is placed thereon and forced into the mold design by the preforming device 31, the film 60 assumes the shape of the mold and is disposed between the mold surfaces and the rubber. The continuous film 60 remains in this position during travel of the molds through the molding machine and just before exiting, the film is cooled in unit 10 or by a separate cooler 62 to below its melting temperature so that it may assist in removing the molded strip from the mold surfaces. The cooled strip may be removed rom the tread by any suitable means, or it may be left in place.

A special advantage of this process is that the "flash" or excess rubber is not cured. Therefore it may be trimmed from the tread strip by trimmer 13 and recycled. This avoids large amounts of waste.

In keeping with the present invention, curing can be accomplished in alternate ways.

The preferred method is to radiation cure completely by single or double side exposure after the tread is removed from the mold as shown in FIG. 1. A specific example of this preferred method is the following:

EXAMPLE I

A rubber stock for a truck tread consisting of 25 parts natural rubber, 75 parts Diene, 55 phr of ISAF carbon black, 10 phr of Sunthene 4240 extender oil, 6 phr pentachlorobenzene as a radiation cross-linking promoter, and 0.7 phr of antioxidant is extruded at 100° C. The cross section of the extruded rubber should be similar to the molded tread to minimize rubber flow in the mold. Slide Water Soluble mold release obtainable from the Percy Harms Corporation may be used to facilitate demolding of the green tread. The mold temperature is maintained at 120° C. The belts are operated at a speed of 6 ft/min. and the flatplate belt 4 is arranged to be 30 ft. in length, so that the molding time is 5 mins. The mold segments enclose the green feed strip 2 and enter the high pressure section H where 1000 psi molding pressure is applied by the reciprocating press apparatus 9. The high pressure which shapes the tread is continued for 20 sec. The mold segments then enter the lower pressure section L where 100 psi is maintained in the latched molds for the remaining molding time. The lower pressure section L allows the rubber to relax after the high pressure shaping. As soon as the mold halves separate, the molded green tread 2' is removed from the tread-design belt 3 before its mold segments 7 begin their circumferential travel around the sprocket 5', so that the molded green tread 2' will not be distorted. The green tread after inversion enters a trough or bath 15 containing water or preferably an aqueous polyethylene oxide solution which fills in the sipes and grooves during radiation curing to ensure a uniform cross-sectional dose. The tread may then be irradiated from both sides by radiation sources 14. Alternatively, the back side of the tread may be exposed to the beam on the first pass. The tread may then travel around a roller and the tread-design surface filled with liquid is exposed to the beam on the second pass. The total average does is 8 megarads. After radiation curing, the tread is ready for the cushioning and retreading operations.

If, for some reason, cooling is desired, a continuous process with this method using cooling in the mold may be carried out as follows:

EXAMPLE II

A passenger tire tread from stock containing 100 phr Duradene, 65 phr HAF carbon black, 20 phr Sunthene 4240 extender oil, 1 phr antioxidant and 6 phr pentachlorobenzene as radiation cure promoter is extruded at 6 ft./min. and 100° C. The flat-plate belt 4 is again arranged to be 3 ft. in length and the molds are heated to 120° C. Molding pressure is applied by the sprocket 6 and rollers 39. During the high pressure phase, toggled latches 40 are closed on the cam surfaces 41 on the sides of the mold segments 7 (see FIG. 4) to retain the internal molding pressure during the remaining molding time. A silicone mold release Kraxo 1711 obtainable from Contour Chemical is used to ensure good release. Two minutes after the mold cycle has started, the molds are cooled by running them through a water bath in unit 10 for 3 minutes to increase the viscosity of the rubber and thus stabilize the shape of the tread pattern. The molded tread stock 2' is then removed from the mold. The tread is cured as in Example I to a 9 megard total average dose. The mold segments are reheated to 120° C. in heaters 11 and 12 before they begin the next molding cycle.

It will be seen that removal of the molded rubber strip from the mold in the uncured state and the subsequent curing thereof by radiation or heat, or both, facilitates the rapid production of a continuous tire tread which may then be processed in a manner providing an improved retreading operation.

If for some reason, however, some curing of the rubber before removal from the mold is desired, the present apparatus is adaptable to such a process. for example, a partial heat cure may be effected throughout the entire tread, in which case a heat cure package would be incorporated during compounding of the rubber stock. The stock would then be extruded at moderate temperatures, typically at about 100° C., to avoid onset of curing in the extruder. After extrusion the stock may be heated uniformly to curing temperature using a microwave oven as the preheater 30. Such an oven would heat the rubber of the strip uniformly. The oven would increase the temperature of the green rubber from the extruder to a cure temperature of about 160° C. preparatory to transfer to the mold. With this process the onset of curing in the stock will not happen immediately, however. An induction period of several minutes will occur (approximately 4 min. for typical stock at 160° C.), the exact amount of which is dependent on the temperature and type of cure system being used. Since partially cured stock will not mold well, it is important to time the onset of cure in the stock such that it occurs when the stock has already entered the molding machine and has evenly filled all of the voids of the mold cavity. It is accordingly preferable to time the curing to begin when the mold segments have just passed the high pressure zone.

Using this initial cure approach three alternative techniques for completing the cure may be achieved. The rubber may be fully heat cured in the mold; or the rubber may be partially heat cured in the mold; followed by a completion of the cure by heat after extraction of the partially-cured tread from the mold or during retreading; or the ruber may be partially heat cured in the mold followed by radiation cure after removal from the mold. In the latter method it is necessary to be sure that the heat cure and the radiation cure together add up to the proper amount of cure desired for the tread. Hence, an appropriate adjustment must be made in the heat cure package incorporated in the stock during mixing and in the radiation dose. In all three methods at least some curing is effected by a sulfur cure package, so that adhesion problems will not be encountered between the cured tread and the cushion gum later added for retreading. An example is as follows:

EXAMPLE III

The truck tread compound used in Example I is mixed with 1 phr of sulfur and 0.8 phr Santocure. The stock is vacuum extruded at 100° C. A continuous microwave oven unit is used to preheat the stock to 170° C. just before molding. The hot extrudate enters a 30 ft. long molding unit at a speed of 3 ft./min. The pressure cycle and mold release are the same as in Example I. A 10 min. molding time is sufficient to chemically crosslink the entire tread to the desired modulus. Alternatively, the mold unit may be operated at higher processing rates (greater then 3 ft./min.) which would result in a partial cure of the tread. The cure may then be completed by irradiation following extraction of the precured tread from the molding unit or by heat curing. The latter may be done by use of an oven placed in line with the molding unit or could be done during retreading. In this case, however, the precure would have to exceed a certain minimum level of cure sufficient to withstand the pressure imposed on the precured tread during the retreading operation.

A further technique which may be used to facilitate undistorted tread removal from the mold is the use of a partial or full surface heat cure of the tread stock in the mold. With this method the stock is again compounded with the heat cure package and extruded at moderate temperatures typically about 100° C. However, no preheating is effected prior to the rubber entering the molding machine. The mold segments may be heated using the heaters 10, 11 and 12 to a temperature suitable for curing the stock, typically about 170° C. Contact between the segment surfaces and the rubber will cause substantial heat transfer from the mold to the stock, hence a partial or full curing of the rubber layer in immediate proximity to the surface of the mold segment will be effected. Again, as an induction period of several minutes may occur before the onset of cure, the molding of the rubber can be completed during the high pressure stage before curing at the surface of the rubber stock results. The surface cured stock may then readily be removed from the mold segment and distortion of the tread design during and following extraction from the mold may be minimized.

The advantage of the surface cure is that it may, be carried out without the need for a microwave preheater. A full cure of the tread with this technique can then be effected by radition or possibly by heat cure using hot air, salt bath, or similar curing methods.

The use of a vacuum extruder would be helpful for both processes, that is, partial cure or surface cure, but probably would not be required in all cases.

To facilitate adhesion between the tread stock and the cushion gum applied prior to retreading, certain important parameters have been observed. It has been found that if a sulfur package containing 50–100% of what is normally used for a full cure of the rubber stock is present in the material, no adhesion problems are encountered. However, if the stock is only cured by radiation and hence no sulfur cure package is added during compounding, then an unsatisfactory low adhesion between the tread stock and the cushioning gum is noted. In such as event it has been found that the spraying or brushing of the stock with a solution containing the sulfur and accelerator normally used for the heat cure of the stock will result in a sufficiently high deposition of the cure package in the surface layer of the tread to obviate the encountering of subsequent adhesion problems. The addition of the cure package to the surface of the tread stock via solution treatment should be done subsequent to molding and curing and even buffing of the tread stock, but prior to the application of the cushion gum.

A specific example of a method using a sulfur package is as follows:

EXAMPLE IV

The truck tread compound used in Example I is mixed with 1 phr of sulfur and 0.8 phr Santocure. The stock is vacuum extruded at 100° C. The extrudate then enters a 30 ft. long molding unit driven at 6 ft./min. and with a mold temperature of 170° C. The pressure cycle and mold release are the same as in Example I. The 5 minute molding time is sufficient to chemically crosslink the surface of the tread to half the desired modulus. This sulfur precure is useful in achieving a distortion-free extraction of the surface-precured tread from the mold. The tread can then be fully cured by radiation or by heat curing.

An apparatus and method are accordingly presented for rapidly and effectively producing a continuous rubber tread for use in retreading automotive tires. The apparatus is suitable for use with the preferred method and with various alternative methods, all of which are readily adaptable to facilitate the retreading operation.

What is claimed is:

1. Apparatus for producing a continuous rubber strip molded with a surface design comprising:
   1. means for extruding uncured rubber at a temperature below the curing temperature into a continuous moving rubber strip;
   2. molding means for receiving and impressing a surface design on said strip comprising:

3. a first moving endless belt means, having block mold segments which during a portion of their travel butt together, for forming a continuous design pattern into which the strip is received;
4. a second moving endless belt means, having flat-plate segments which during a portion of their travel cooperatively move with said block mold segments for pressing the strip into the design pattern after it has been received in the block mold segments;
5. means for applying a high pressure of about 1000 psi to said strip while pressed in the block mold segments; said high pressure applying means comprising;
   A. frame means for moving reciprocatingly along the path of travel of said first and second endless belt means within said molding means;
   B. press means mounted on said frame means for engaging and urging successive flat-plate segments to press the strip into the design pattern during successive movements of the frame means in the direction of travel of sad first and second endless belt means;
6. means for maintaing a lower pressure on said strip after the imposition of said high pressure while said strip remains in the molding means;
7. means for releasing said maintaining means to remove all external pressure from the molded strip upon its moving out of the molding means; and
8. means for removing the molded strip from said block mold segments after moving out of the molding means.

2. Apparatus as in claim 1 wherein said lower pressure maintaining means comprises:
toggle latch means mounted on said of said flatplate segments for engaging said block mold segments to hold said segments together.

3. Apparatus as in claim 2 wherein said lower pressure maintaining means further comprises:
frame means for moving reciprocatingly along the path of travel of said first and second endless belt means within said molding means; and
actuating means mounted on said frame means for actuating the toggle latch means on each successive flat-plate segment during successive movements of the frame means in the direction of travel of said first and second endless belt means to engage successive block mold segments and lock together cooperating flatplate segments and block mold segments.

4. Apparatus as in claim 2 wherein said releasing means comprises means for disengaging said toggle latch means from said block mold segments.

5. Apparatus as in claim 1 wherein said removing means comprises means, disposed downstream of the point where said block mold segments and said flat-plate segments complete the portion of their cooperative travel together, for transporting the molded strip.

6. Apparatus as in claim 1 further comprising preheating means, disposed between said extruding means and said molding means, for heating the strip before being received by said molding means.

7. Apparatus as in claim 1 further comprising means for curing the rubber of said molded strip after its removal from said block mold segments by said removing means.

8. Apparatus as in claim 7 wherein the rubber of said strip contains a sulfur package and said curing means comprises means for producing a partial radiation cure of the rubber of said molded strip and means for heat curing the sulfur package.

9. Apparatus as in claim 1 wherein said second endless belt means comprises a sprocket means for guiding said flat-plate segments and said high pressure applying means comprises roller means engaging said block mold segments for cooperating with said sprocket means to apply pressure to said strip between said segments.

10. Apparatus as in claim 1 further comprising means for applying a release agent to said strip to facilitate its release from said block mold segments.

11. Apparatus as in claim 1 further comprising means for applying a release agent to said block mold segments to facilitate the release of said strip therefrom.

12. Apparatus as in claim 1 further comprising means for interposing a meltable strip film between said strip and the design pattern in said block mold segments.

13. Apparatus as in claim 12 further comprising:
means for heating said meltable strip to above its melting temperature before said interposition; and
means for cooling said meltable strip to below its melting temperature while interposed.

14. Apparatus as in claim 1 further comprising preforming means disposed between said extruding means and said molding means for pressing the strip into the block mold segments prior to entering the molding means.

15. Apparatus as in claim 1 further comprising means for hinging said flat-plate segments at the surfaces which are in contact with said rubber strip.

16. Apparatus as in claim 1 further comprising means for hinging said block mold segments at the surfaces which are remote from the surfaces in contact with said rubber strip.

17. Apparatus as in claim 1 further comprising means for heating said block mold segments.

18. Apparatus as in claim 1 further comprising curing means for producing a complete radiation cure of the rubber of said molded strip after removal from said molding means by said removing means.

* * * * *